(12) United States Patent
Smith (10) Patent No.: US 6,681,688 B1
(45) Date of Patent: Jan. 27, 2004

(54) ROUND BALER WITH SELF ALIGNING KNIVES FOR TWINE WRAPPER

(75) Inventor: Kevin M. Smith, Narvon, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/242,443

(22) Filed: Sep. 13, 2002

(51) Int. Cl.[7] .............................. B30B 9/30; B30B 9/00; B26D 1/56
(52) U.S. Cl. ................................ 100/5; 100/8; 100/88; 100/94; 83/349; 83/585; 83/909
(58) Field of Search .......................... 100/5, 8, 13, 88, 100/87, 89, 94, 97, 76; 83/909, 585, 349, 582; 241/292.1, 286, 289, 290

(56) References Cited

U.S. PATENT DOCUMENTS

| | | |
|---|---|---|
| 2,186,884 A | 1/1940 | Schomaker |
| 2,406,163 A | 8/1946 | Prohaska |
| 2,689,728 A | 9/1954 | Fritzinger |
| 3,196,724 A | 7/1965 | Frank |
| 3,759,118 A * | 9/1973 | Glas .............................. 76/85 |
| 3,769,868 A | 11/1973 | Hornung |
| 3,995,783 A | 12/1976 | Bertrand et al. |
| 4,151,797 A * | 5/1979 | Dunsirn ........................ 101/169 |
| 4,691,606 A * | 9/1987 | Johnson et al. ................ 83/175 |
| 5,184,545 A * | 2/1993 | Jennings et al. ................ 100/5 |
| 5,215,006 A | 6/1993 | Jennings et al. |
| 5,709,143 A | 1/1998 | Bentley |
| 6,209,450 B1 | 4/2001 | Naaktgeboren et al. |

* cited by examiner

Primary Examiner—Allen Ostrager
Assistant Examiner—Jimmy Nguyen
(74) Attorney, Agent, or Firm—John William Stader; Collin A. Webb; Rebecca L. Henkel (57) ABSTRACT

A round baler includes a housing, a bale chamber, and a bale wrapping apparatus. The bale wrapping apparatus includes two twine supply rolls providing two twine strands; two twine dispensing arms, each presenting one of the two strands; a shear bar connected to the housing; and a knife assembly rotatingly connected to the housing by an elongated bar to rotate from a first position to a second cutting position, the two twine strands extending transversely between the shear bar and the knife assembly, the knife assembly comprising: a mounting assembly comprising a mounting member having two protruding posts; a knife having two slots formed therein and a cutting edge, the knife mounted on the mounting member so each protruding post extends through one of the slots; and a biasing member disposed on each post to bias the knife toward the mounting member while permitting the knife to move relative to the mounting member.

12 Claims, 8 Drawing Sheets

ROUND BALER WITH SELF ALIGNING KNIVES FOR TWINE WRAPPER

FIELD OF THE INVENTION

The present invention pertains to round balers with a twine wrapping apparatus that includes an improved twine cutting apparatus. More particularly, the present invention pertains to an improved twine cutting apparatus including self-aligning twine cutting knives.

BACKGROUND OF THE INVENTION

Typical round balers (also referred to simply as a "balers"), such as disclosed in U.S. Pat. No. 6,209,450 to Naaktgeboren et al., are agricultural machines that pick up a cut crop material from the ground and form it into a compacted round bale in a bale-forming chamber. When the bale has been sufficiently compacted to a desired density or a desired size depending on the baler construction, appropriate sensors, such as a bale density or bale size sensor, send signals to a controller. The controller subsequently sends a signal to an operator's panel to stop forward motion of the baler so that a bale wrapping operation can be performed. In this way, the formed bale is wrapped with netting or twine to produce a completed, wrapped bale.

As is conventionally known, the wrapping operation is performed by a bale wrapping mechanism controlled by a bale wrapping algorithm preprogrammed into a controller (i.e., microprocessor) that is part of the baler. The bale wrapping mechanism has two twine wrapping tubes/arms, wherein each tube/arm dispenses a single strand of twine. When a wrap cycle is initiated, the end of each twine strand dangles from its twine tube and is caught by the bale as the bale continues to rotate in the bale forming chamber. As the bale rotates, the caught ends of the twine strands rotate with the bale and twine is wrapped around the bale. At the end of a wrap cycle, a tying operation is performed as is generally known. Before the completed, wrapped bale can be expelled from the baler, the twine strands must be cut.

The bale wrapping mechanism includes a knife assembly having a cutting edge, and a shear bar that cooperates with the cutting edge of the knife assembly. The knife assembly generally includes two knives (i.e., a right knife and a left knife), each with its own cutting edge. At the start of a wrap cycle, the twine strands are positioned between the knife assembly and the shear bar, and the knife assembly and shear bar are spaced apart so that the twine strands can move freely between the knife assembly and the shear bar. At the end of the wrap cycle (i.e., after the twine ends have been secured by tying), the knife assembly moves by translation or rotation to engage the shear bar, so that the cutting edge of each knife of the knife assembly pinches a respective one of the twine strands against the shear bar, and the twine strands are cut.

One drawback of the prior art bale wrapping mechanism is that the knife assembly has to be properly aligned with the shear bar in order to ensure proper severing of the twine strands by the bale wrapping mechanism. As is generally known, proper alignment may require one or more of the following parameters to be adjusted: (1) position of the knife assembly and cutting edge, (2) position of the shear bar, (3) position of the left knife relative to the position of the right knife, and (4) force with which the cutting edge of the knife assembly strikes the shear bar. In addition, these alignment adjustments become more difficult and complex when considering the new round balers that include a bale wrapping apparatus that has four twine wrapping tubes/arms, wherein each tube/arm dispenses a single strand of twine. The advantage of a round baler having four twine strands provided for wrapping over the conventional two twine strands is that four strands permit completion of the wrapping operation in less time than can be achieved when only two strands are available.

For these reasons, it would be advantageous to have a bale wrapping mechanism that includes a knife assembly having self aligning knives whereby the self aligning knives automatically adjust the orientation of the cutting edge of each knife to the shear bar to ensure reliable severing of all of the twine strands.

The present invention endeavors to provide a round baler with an improved bale wrapping apparatus with a knife assembly having self-aligning knives whereby the self-aligning knives automatically adjust the orientation of the cutting edge of each knife to the shear bar to ensure reliable cutting of all of the twine strands.

Accordingly, an object of the present invention is to overcome the disadvantages of prior art round balers.

Another object of the present invention is to provide a round baler with improved bale wrapping apparatus having a knife assembly with self aligning knives that is practical and cost effective to manufacture.

A still further object of the present invention is to provide a round baler with improved bale wrapping apparatus having a knife assembly with self-aligning knives that is durable and that reliably cuts all of the twine strands.

Yet another object of the present invention is to provide a round baler with improved bale wrapping apparatus having a knife assembly with self-aligning knives that is easy to maintain.

SUMMARY OF THE INVENTION

In accordance with the above objectives, one embodiment of the present invention provides a round baler, including a housing with a bale chamber defined therein, and a bale wrapping apparatus, disposed in the housing adjacent the bale chamber to wrap a rotating bale formed in the chamber, the bale wrapping apparatus characterized by: (a) two twine supply rolls rotatingly connected to the housing and defining two twine strands; (b) two twine dispensing arms, each dispensing arm presenting one of the two twine strands; (c) a first shear bar connected to the housing; and (d) a first knife assembly rotatingly connected to the housing by an elongated bar and rotation from a first position to a second cutting position in contact with the first shear bar, wherein each twin dispensing arm is movable from a first position presenting a strand to the bale to a second position wherein the twine strand extends transversely between the first shear bar and the first knife assembly, the first knife assembly comprising: (i) a mounting assembly comprising a mounting member having two protruding posts; (ii) a knife having two slots formed therein and a cutting edge, the knife mounted on the mounting member so that each protruding post extends through one of the slots; and (iii) a biasing member disposed on each post so as to bias the knife toward the mounting member while permitting the knife to move relative to the mounting member when the cutting edge of the knife rotates toward the second cutting position in contact with the first shear bar.

In accordance with a second embodiment, each biasing member is a spring.

In accordance with a third embodiment, each biasing member is a washer or grommet made of elastically compressible material.

In accordance with a fourth embodiment, the first embodiment further comprises: (e) two additional twine supply rolls rotatingly connected to the housing and defining two additional twine strands; (f) two additional twine dispensing arms, each dispensing arm presenting one of the two additional twine strands; (g) a second shear bar connected to the housing; and (h) a second knife assembly rotatingly connected to the housing by the elongated bar and rotatable from a first position to a second cutting position in contact with the second shear bar, wherein each additional twin dispensing arm is movable from a first position presenting a twine strand to the bale to a second position wherein the additional twine strand extends transversely between the second shear bar and the second knife assembly, the second knife assembly comprising: (i) a mounting assembly comprising a mounting member having two protruding posts; (ii) a knife having two slots formed therein and a cutting edge, the knife mounted on the mounting member so that each protruding post extends through one of the slots; and (iii) a biasing member disposed on each post so as to bias the knife toward the mounting member while permitting the knife to move relative to the mounting member when the cutting edge of the knife rotates toward the second cutting position in contact with the second shear bar.

In accordance with a fifth embodiment, the fourth embodiment is further modified so that each biasing member is a spring.

In accordance with a sixth embodiment, the fourth embodiment is further modified so that each biasing member is a washer or grommet made of elastically compressible material.

In accordance with a seventh embodiment of the present invention, there is provided an assembly for cutting multiple twin strands comprising: (a) a shear bar; (b) a rotatable bar; (c) a mounting assembly comprising a mounting member having two protruding posts, the mounting assembly being attached to the rotatable bar; (d) a knife having two slots formed therein and a cutting edge, the knife mounted on the mounting member so that each protruding post extends through one of the slots; and (e) a biasing member disposed on each post so as to bias the knife toward the mounting member; while permitting the knife to move relative to the mounting member. The cutting edge of the knife is rotatable toward a cutting position in contact with the shear bar. Preferably, each biasing member is a spring, a washer or a grommet made of elastically compressible material.

Further objects, features and advantages of the present invention will become apparent from the Detailed Description of Preferred Embodiments, which follows, when considered together with the attached drawings.

DETAILED DESCRIPTION OF THE PREFERRED EMBODIMENTS

Figure 1:
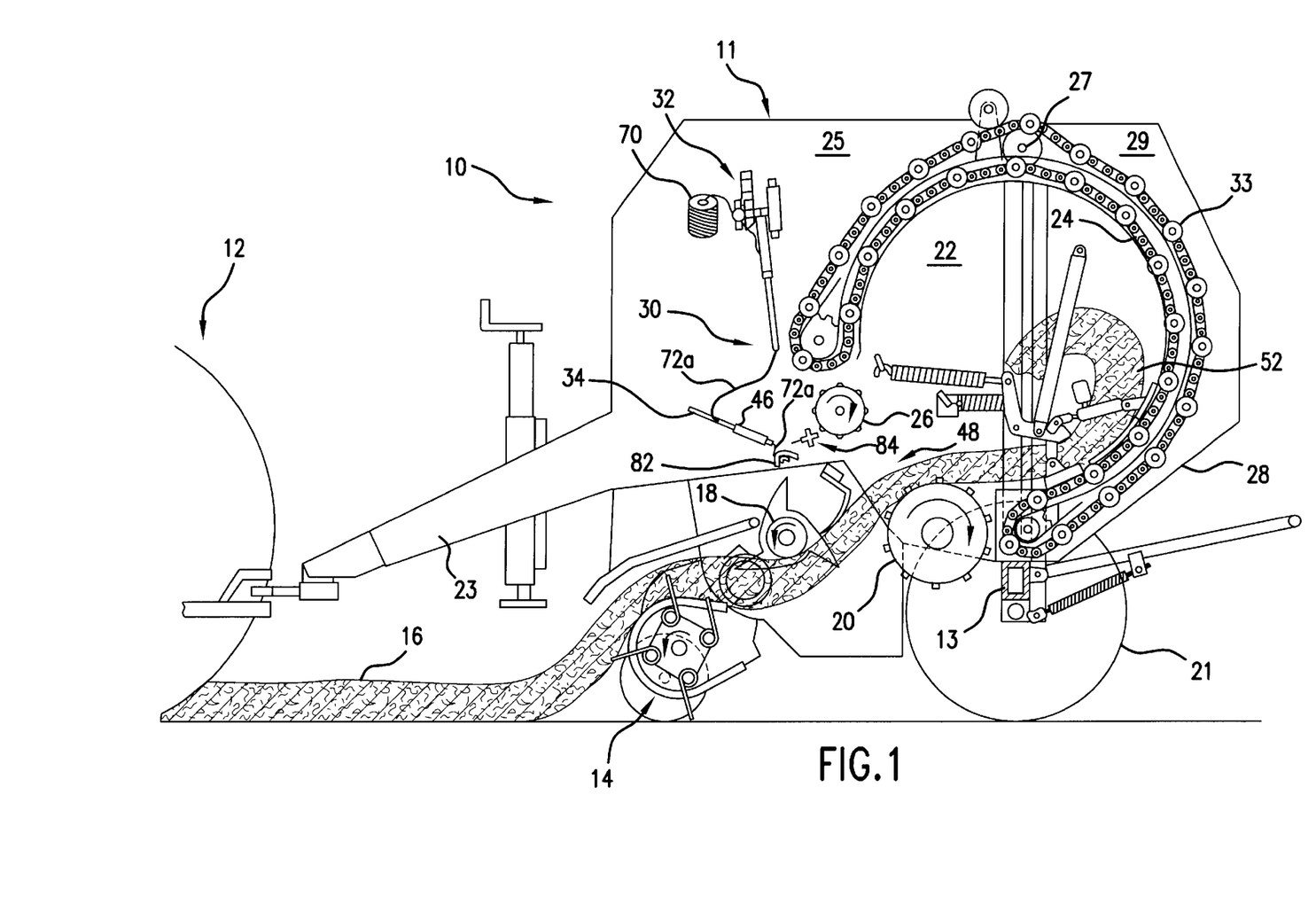
FIG. 1 is a cutaway side elevational view of a round baler in accordance with the present invention.

The preferred embodiments of the invention will now be described with reference to the Figures in which like parts are indicated by like reference numerals. The apparatus of the present invention as shown in FIG. 1 is a round baler 10 including a main frame or housing 11 and a bale forming chamber 22 formed inside of housing/frame 11, wherein the bale forming chamber is illustrated as a fixed bale forming chamber for forming a geometrical package out of cut crop material 16. The geometrical package of cut crop material formed in the bale forming chamber 22 is known as a "bale." The bale is formed by a chain conveyer 24, also referred to as an "apron," that surrounds and defines a portion of the chamber 22. Apron 24 serves to rotate the cut crop material in the bale forming chamber 22 by using slats 33 of the apron 24 that engage and rotate the cut crop material, thereby moving the cut crop material about the bale forming chamber 22 to form the bale 52 as described in U.S. Pat. No. 6,164,050, which is incorporated herein by reference in its entirety. Preferably, the bale produced in the bale forming chamber 22 has a cylindrical shape. However, one skilled in the art would appreciate that the present invention can be practiced on balers that produce rectangular bales and can be practiced by round balers having a variable bale forming chamber.

Main frame 11 includes a main support beam 13 on which a pair of wheels 21 (only one shown) is rotatably affixed. A tongue 23 extends from a front portion of frame 11 to provide a conventional hitch connection for connecting to a tractor 12 or other work vehicle. Frame 11 also includes a pair of sidewalls 25 (only one shown) between which the bale forming chamber 22 extends. A pair of stub shafts 27 (only one shown) pivotally connect tailgate 28 to main frame 11. Tailgate 28 pivotally rotates about the stub shafts 27 from the closed position shown in FIG. 1 to an open position, as is conventionally known, so that a completed wrapped bale can be discharged to the ground for subsequent handling. Tailgate 28 includes a pair of tailgate sidewalls 29 (only one shown) that are coextensive with sidewalls 25.

Baler 10 includes a pick-up assembly 14 for picking up a cut crop material 16, such as straw, hay, and the like, from a field, and delivering it to a moving conveyer 18. Conveyer 18 feeds the cut crop material into the bale forming chamber 22 while the baler moves across a field. Although FIG. 1 shows conveyer 18 to be a feeder rotor, one skilled in the art would recognize that a stuffer mechanism, such as disclosed in U.S. Pat. No. 5,595,055 to Horchier, Jr., et al., which is incorporated herein by reference in its entirety, could be used in place of the feeder rotor without departing from the scope of the present invention. The pick-up assembly 14 operates in a conventionally-known manner.

The bale forming chamber 22 is defined by the coextensive sidewalls 25 and 29, apron 24, rotating floor roll 20, and rotating stripper roll 26. A rotating bale 52 is formed within the bale forming chamber 22 when cut crop material is fed into the chamber by the pickup assembly 14, as is conventionally known. When the bale 52 reaches a predetermined size, such as occurs in variable size chambers, or, in the alternative, when the bale 52 reaches a predetermined density, such as occurs in fixed size chambers, appropriate size or density sensors, respectively, indicate that the bale is ready to be wrapped. Subsequently, the baler 10 stops its forward motion while a bale wrapping operation is performed by a bale wrapping assembly 30.

Bale wrapping assembly 30 is disposed within housing/frame 11 so as to be adjacent to the bale forming chamber 22 and serves to wrap wrapping material, such as net, twine or plastic sheet, around the bale 52 formed within the bale forming chamber. The bale wrapping assembly 30 illustrated in FIG. 1 includes a twine wrapping apparatus 32 and may include a net wrapping apparatus (not shown) as is, for example, disclosed in U.S. Pat. No. 6,209,450. Typically, the twine wrapping apparatus 32 dispenses twine 72a that is stored on a twine ball 70, and the net wrapping apparatus dispenses netting or plastic sheet that is stored on a roll. When the bale 52 is completely formed, the operator of the baler 10 operates the bale wrapping assembly to dispense either twine 72a or netting/plastic sheeting in a known manner.

Figure 2:
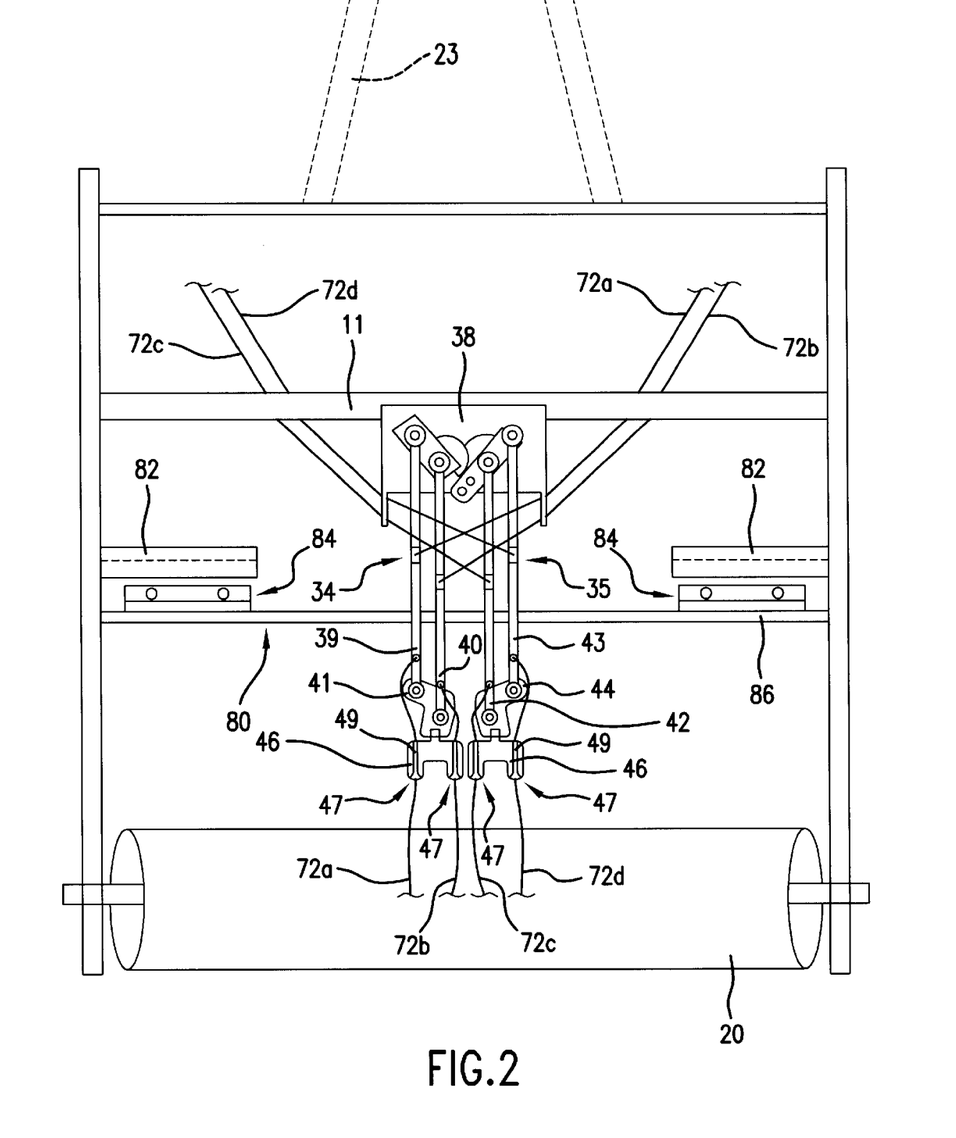
FIG. 2 schematically illustrates a plan view of the twine wrapping apparatus and the twine cutting mechanism with the twine arm support members in the first position.
Figure 3:
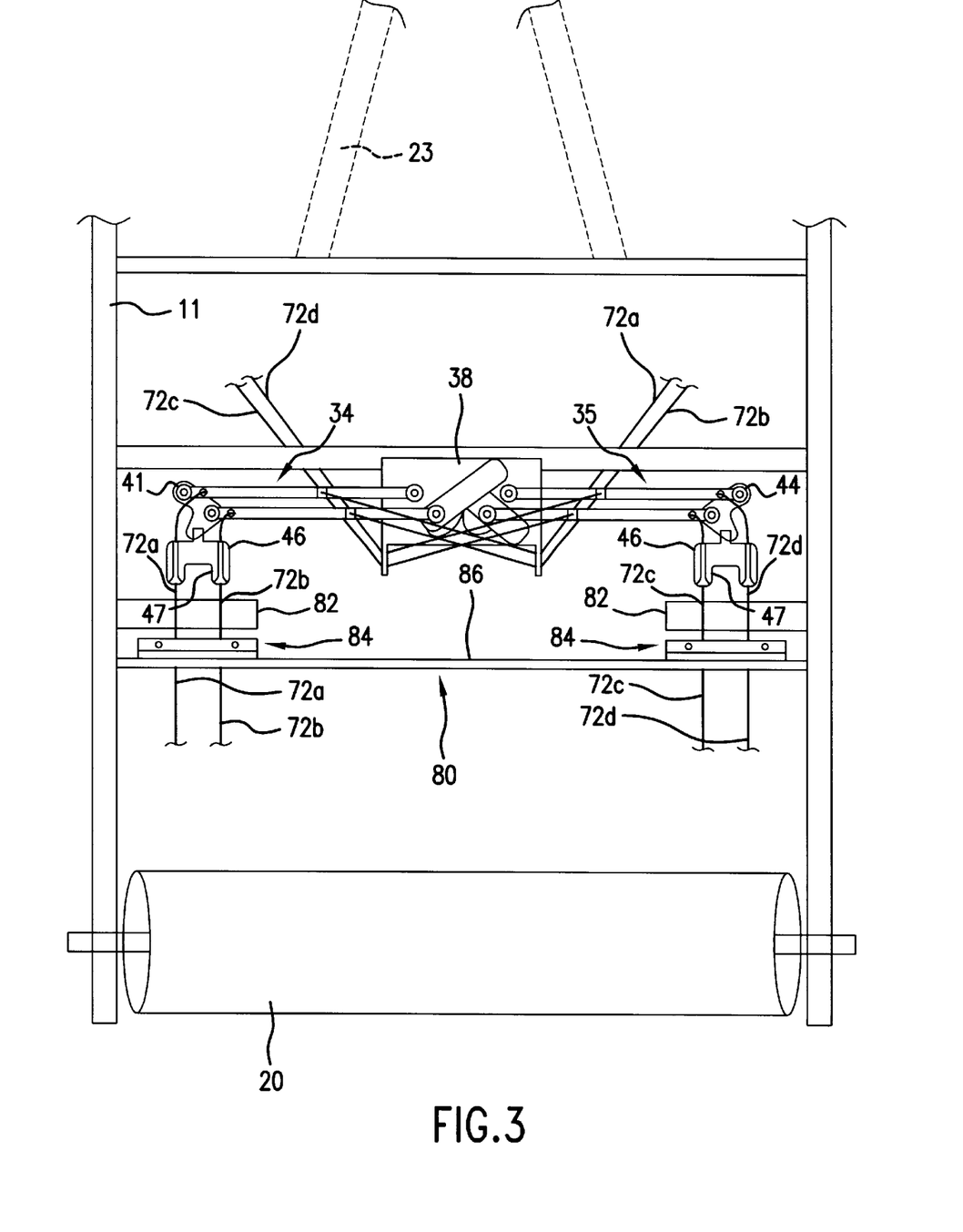
FIG. 3 schematically illustrates a plan view of the twine wrapping apparatus and the twine cutting mechanism with the twine arm support members in the cutting position.

Twine wrapping apparatus 32 includes two pivotally mounted twine arm support members 34 and 35 (only 34 is shown in FIG. 1) upon which are mounted one or two twine arms 47. Although the present invention can be practiced when each twine arm support member 34 has one twine arm 47 (see FIG. 2) mounted thereto; preferably, each twine arm support member has two twine arms mounted thereto as shown in FIGS. 2 and 3. For the purposes of illustration, only a baler in which each twine arm support member 34 carries two twine arms 47 will be described in detail. However, U.S. Pat. No. 5,215,006 to Jennings et al., the disclosure of which is incorporated herein by reference in its entirety, describes a baler wherein each twine support member carries only one twine arm, and the present invention could be applied to this or similar balers.

Figure 4:
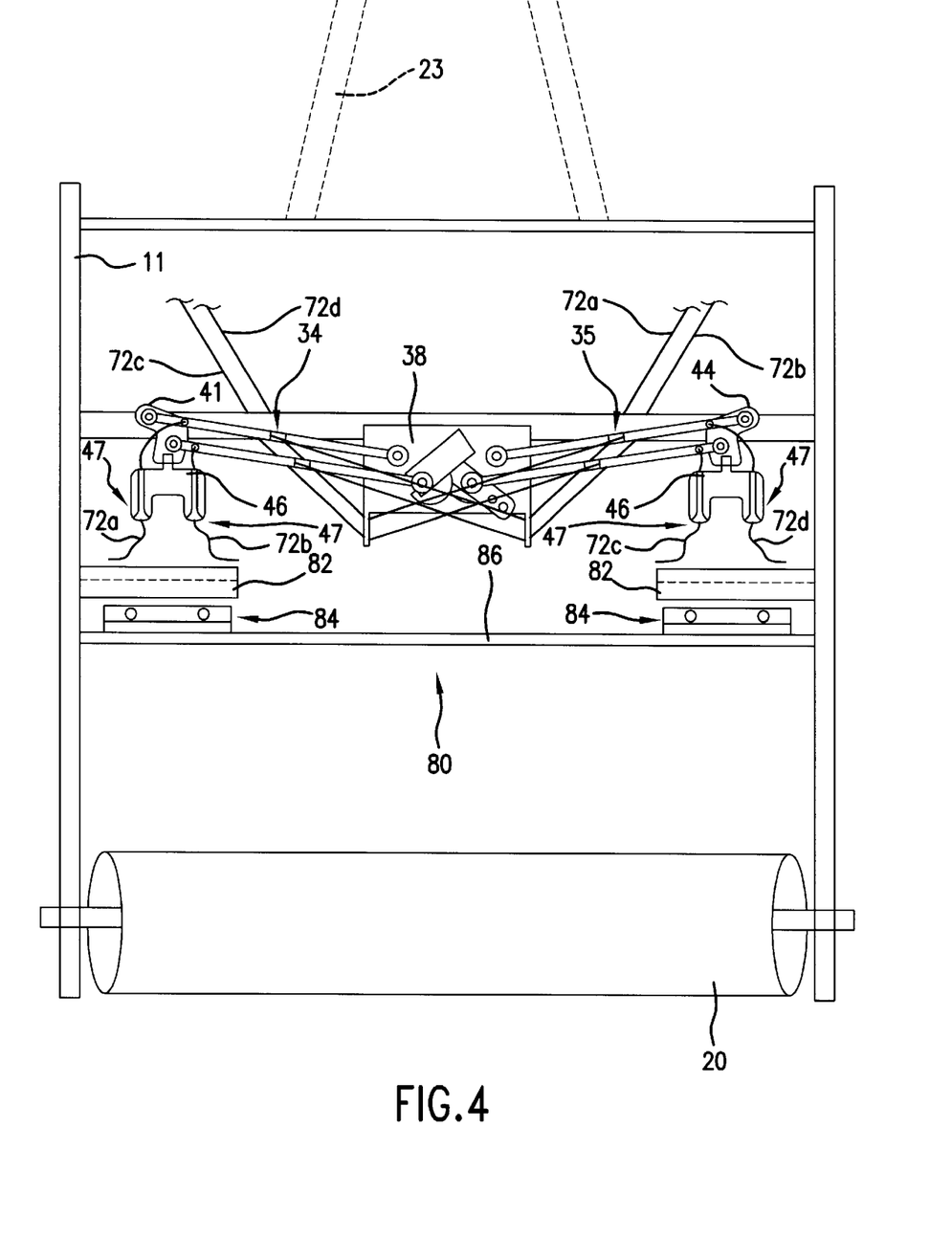
FIG. 4 schematically illustrates a plan view of the twine wrapping apparatus and the twine cutting mechanism with the twine arm support members in the home position.

As shown in FIGS. 2, 3 and 4, the twine wrapping apparatus 32 has a base mount 38 connected to frame 11. Twine arm support members 34 and 35 are pivotally mounted on base mount 38 so that each twine arm support member can pivot between a "first position" shown in FIG. 2 at the start of a twine wrapping cycle as will be described later to a "cutting position" as shown in FIG. 3. Between twine wrapping cycles, the twine arm support members 34, 35 are stored in a "home position" as shown in FIG. 4. Twine arm support member 34 includes two link members 39, 40 that are pivotally connected at one end to the base mount 38 and pivotally connected at another end to cam member 41. Twine arm support member 35 includes two link members 42, 43 that are pivotally connected at one end to base mount 38 and pivotally connected at another end to cam member 44. Each cam member 41 and 44 is connected to an arm member 46 that has two twine arms 47.

Baler 10 is provided with at least four twine balls 70 (only one shown) and each twine ball provides one of the twine strands 72a, 72b, 72c, and 72d. Each twine strand 72a, 72b, 72c, and 72d is threaded through a respective hole in the base mount 38 and through a respective one of the link members 39, 40, 42, 43 because each link member 39, 40, 42, 43 is a hollow tube with openings through which a twine strand may pass. Arm members 46 include two tubular hollow portions 49 through which a twine strand may pass. Each twine arm 47 is preferably a hollow tube that is contiguous with one of the tubular hollow portions 49 of the arm members 46 so that a twine strand may pass through a respective contiguous hollow tube portion 49 and corresponding twine arm 47.

Figure 5:
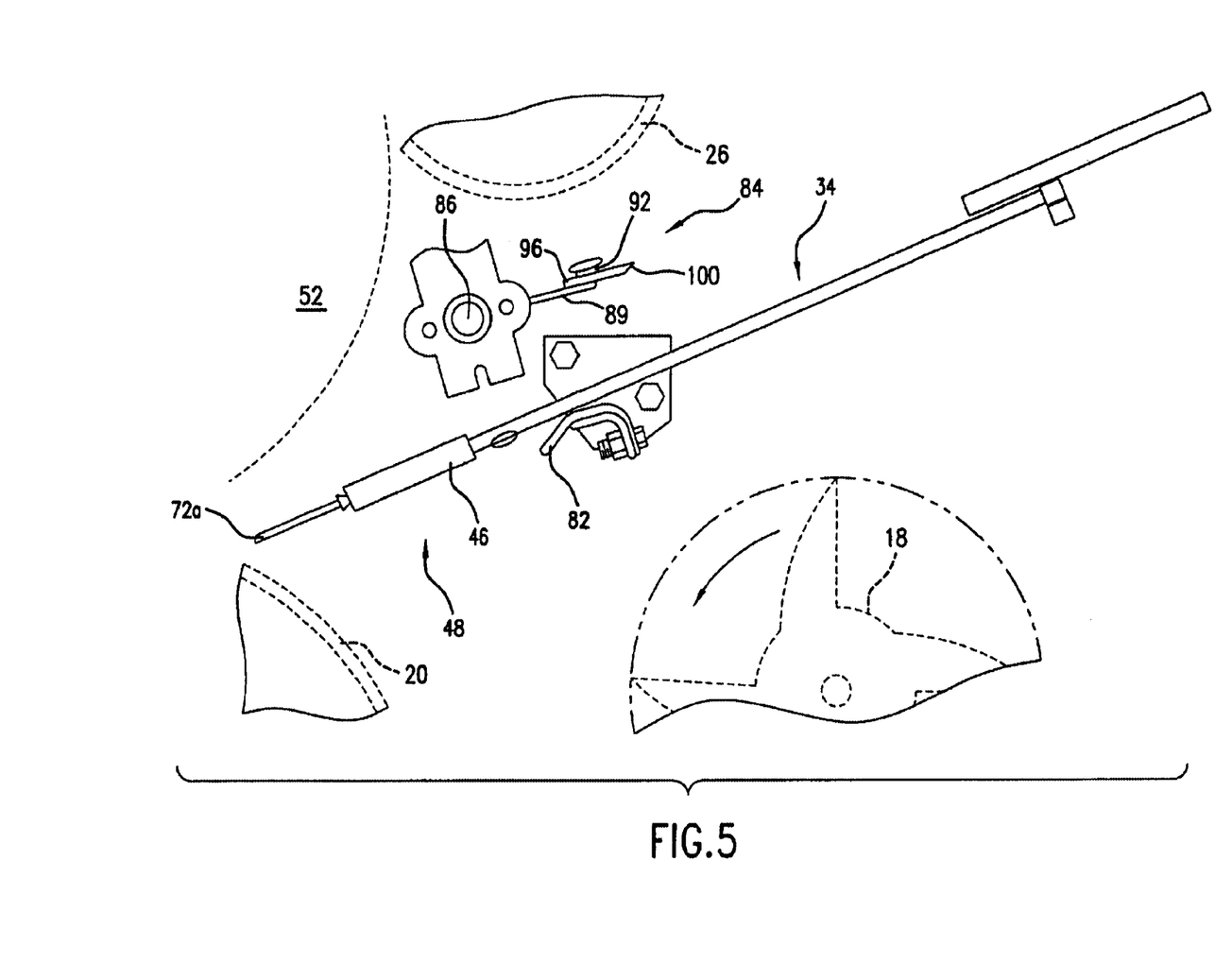
FIG. 5 schematically illustrates a side view of the twine cutting mechanism with the knife assembly in the first knife position and the twine arm support members of the twine wrapping apparatus in the first position.
Figure 6:
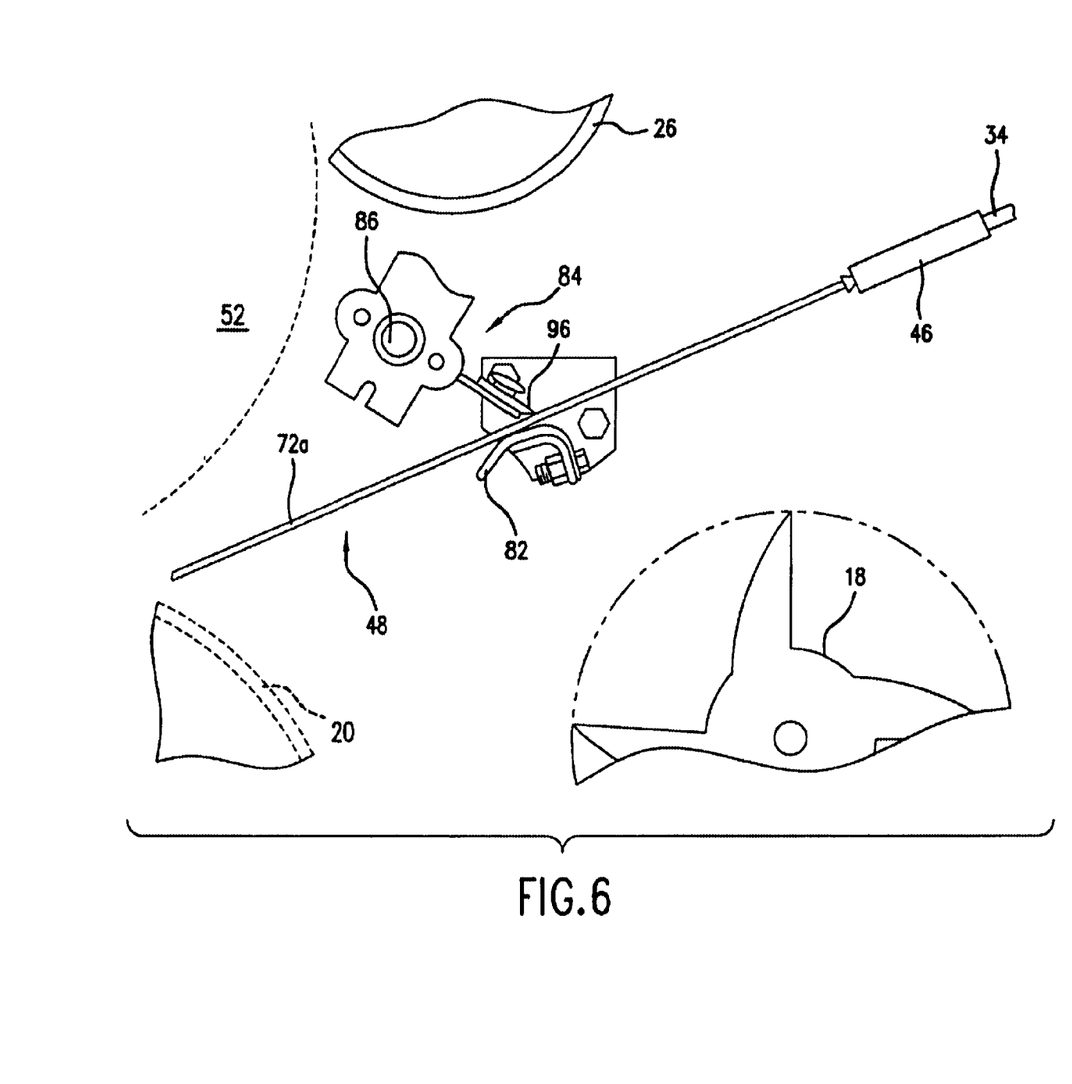
FIG. 6 schematically illustrates a side view of the twine cutting mechanism with the knife assembly in the second knife cutting position and the twine arm support members of the twine wrapping apparatus in the cutting position.

During baler operation, the formation of a bale 52 is achieved in the conventional manner while baler 10 moves along a field of cut crop material picking up the cut crop material with pick-up assembly 14, and delivers the cut crop material using conveyer 18 to move the cut crop material through bale chamber inlet 48 defined by floor roll 20 and stripper roll 26. When the bale 52 has reached a certain size or density, depending upon whether baler 10 is a variable chamber baler or a fixed chamber baler, size or density sensors (as appropriate) are activated and signal the operator or an on board computer that the bale 52 is ready for the bale wrapping operation. Upon initiation of the bale wrapping operation, the twine arm support members 34, 35 move from the home position shown in FIG. 4 to the first position shown in FIGS. 2 and 5. In the first position, the ends of twine strands 72a, 72b, 72c, and 72d dangle into inlet 48 where they get caught and carried by the rotating bale 52. In this manner, the twine strands 72a, 72b, 72c, and 72d wrap around bale 52 and secure the cut crop material as the bale rotates. During a predetermined sufficient number of wrappings, twine arm support members 34, 35 pivot from the first position back to the cutting position shown in FIGS. 3 and 6 so that twine is wrapped around both the center and the peripheral portions of bale 52. When the twine arm support members 34, 35 reach the cutting position, there is tension in each of the twine strands 72a, 72b, 72c, and 72d and a cutting procedure takes place to cut each of the twine strands 72a, 72b, 72c, and 72d simultaneously. The bale wrapping operation concludes with the cutting of the twine strands, the twine arm support members 34, 35 return to the home position, and the completed wrapped bale is discharged to the ground when tailgate 28 opens.

The present invention is particularly directed to the twine cutting mechanism that performs the cutting procedure that simultaneously severs each one of the twine strands 72a, 72b, 72b, and 72d. The twine cutting mechanism 80 includes two shear bars 82 connected to housing/frame 11, and two knife assemblies 84 rotatingly connected to the housing/frame 11 by an elongated bar 86 so as to rotate from a first knife position shown in FIG. 5 to a second knife cutting position shown in FIG. 6. Each knife assembly 84 is disposed so as to contact a respective one of the shear bars 82 when the knife assemblies have been rotated into the second knife cutting position.

Figure 7:
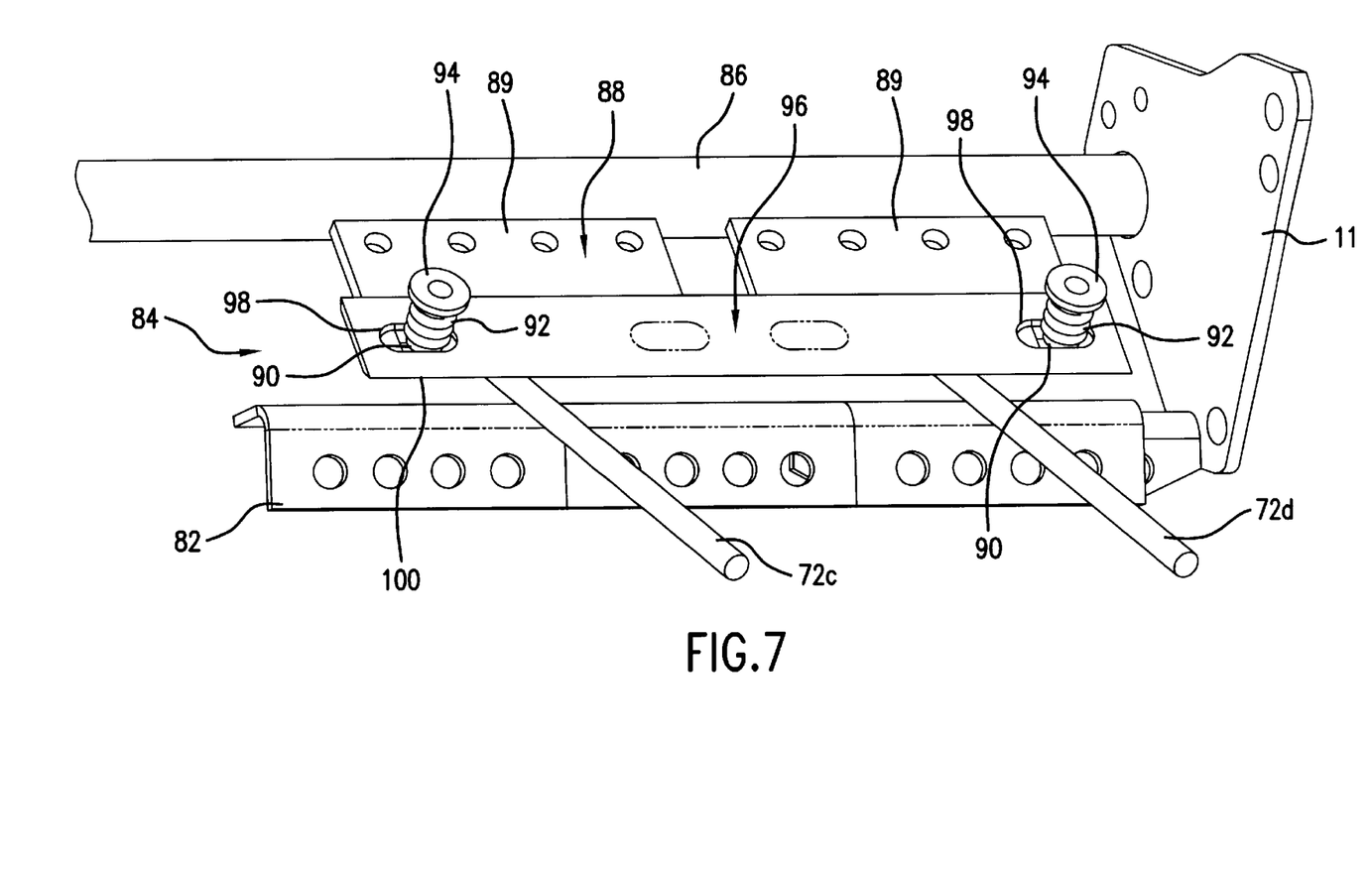
FIG. 7 is a close-up perspective view of the shear bar and knife assembly in accordance with the present invention.

Each knife assembly 84 includes a mounting member 88 that can be practiced as two plates 89 attached to the elongated bar 86, or alternatively, a single larger plate can be used in place of the two smaller plates 89. The mounting member 88 includes two protruding posts 90 with a knife biasing member 92 disposed on each post. The knife biasing member 92 can be a spring as shown in FIG. 7, or it can be washer or grommet made of elastically compressible material, including rubber, soft plastics and foams, etc. Each biasing member 92 is secured to its respective post 90 by stop member 94 attached to one end of post 90. Stop member 94 can be fixed to the end of post 90 by a fastener (not shown) such as a bolt or screw.

Each knife assembly 84 also includes a knife 96 having two slots 98 formed therein. Each knife 96 is disposed so that each post 90 of the corresponding mounting member 88 extends through one of the slots 98 and the knife 96 is positioned between the plates 89 and the biasing members 92. Furthermore, knife 96 is positioned on the mounting member 88 so that the cutting edge 100 of knife 96 is oriented to point radially away from elongated bar 86. In this manner, it is the cutting edge 100 of each knife 96 of each knife assembly 84 that contacts the respective shear bar 82 when the knife assembly 84 is rotated into the second knife cutting position.

Figure 8:
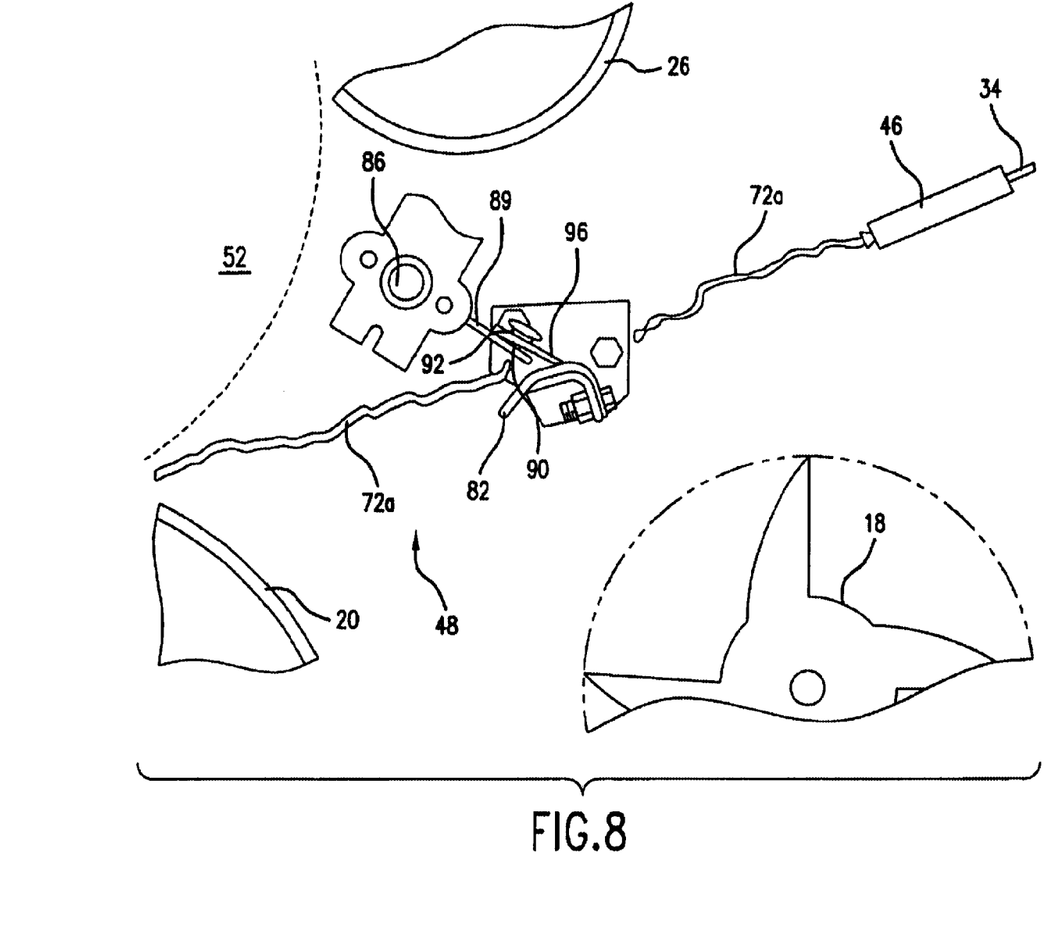
FIG. 8 schematically illustrates a side view of the twine cutting mechanism with the knife assembly in the second knife cutting position, the twine arm support members of the twine wrapping apparatus in the cutting position, and the knife has been displaced on the mounting member due to contact with the shear bar.

As shown in FIG. 7, each biasing member 92 is partially compressed and exerts a force against knife 96 so as to bias the knife to abut against the plates 89 of mounting member 88. However, knife 96 is not fixed to the plates 89 and is free to move away from plates 89 whenever the biasing force of the biasing member 92 is overcome by another external force on the knife. FIG. 8 demonstrates that knife 96 is free to move away from plate 89 when biasing member 92 is further compressed due to the external force exerted by shear bar 82 upon knife 96 when the knife is in contact with the shear bar in the knife cutting position.

The purpose of this movement or play in the position of knife 96 on the plates 89 of mounting member 88 is to optimize contact between the cutting edge 100 of knife 96 and the shear bar 82 when the knife is in the knife cutting position. Specifically, in the prior art cutting mechanisms, the knife is fixed to the mounting member so that any misalignment between the knife and the shear bar may result in contact between only a small portion of the cutting edge of the knife with a small portion of the shear bar. Such poor contact between the knife and the shear bar can result in improper cutting of the twine strand extending transversely between the shear bar and the knife assembly. When there are two twine strands extending transversely between a shear bar and the corresponding knife assembly, the likelihood that at least one of the two twine strands will not be properly cut increases when there is misalignment between the knife and the shear bar. With the structure of the twine cutting mechanism 80 of the present invention, the effect of misalignment between the knife 96 and the shear bar 82 is diminished because the knife 96 is free to move or shift to some degree on plates 89, thereby allowing for more of the cutting edge 100 to contact shear bar 82. In other words, knife 96 is free to move or shift to some degree on plates 89, thereby optimizing the contact between the cutting edge 100 and shear bar 82, which optimizes the likelihood that both twine strands will be cut despite some misalignment between the knife 96 and the shear bar 82.

This self-aligning feature of each knife assembly 84 also allows for improved control of twine cutting as the two knives rotate with shaft 86. In the event that one knife contacts its respective shear bar before the opposing side, the leading knife can move as shown in FIG. 8 so the trailing knife (i.e., the knife on the opposing side) contacts its respective shear bar without interference. In other words, the play in the position of each knife relative to its mounting member allows the elongated shaft 86 to rotate so that the position of the trailing knife relative to its shear bar will be unaffected by misalignment between the leading knife and its shear bar on the opposing side. Of course, this self-aligning feature of the opposing knife assemblies can be applied to bailers with one twine arm per twine arm supporting member or with two twine arms per twine arm supporting member.

While the present invention has been described with reference to certain preferred embodiments, one of ordinary skill in the art will recognize that additions, deletions, substitutions, modifications and improvements can be made while remaining within the spirit and scope of the present invention as defined by the appended claims.

What is claimed is:

1. A round baler, including a housing with a bale chamber defined therein, and a bale wrapping apparatus disposed in the housing adjacent the bale chamber to wrap a rotating bale formed in the chamber, the bale wrapping apparatus comprising:
　(a) two twine supply rolls rotatingly connected to the housing and defining two twine strands;
　(b) two twine dispensing arms, each dispensing arm presenting one of the two twine strands;
　(c) a first shear bar connected to the housing; and
　(d) a first knife assembly rotatingly connected to the housing by an elongated bar and rotatable from a first position to a second cutting position in contact with the first shear bar, wherein each twine dispensing arm is movable from a first position presenting one of the two twine strands to the bale to a second cutting position wherein each of the two twine strands extends transversely between the first shear bar and the first knife assembly, the first knife assembly comprising:
　　(i) a mounting assembly comprising a mounting member having two protruding posts;
　　(ii) a knife having two slots formed therein and a cutting edge, the knife mounted on the mounting member so that each protruding post extends through one of the slots; and
　　(iii) a biasing member disposed on each post so as to bias the knife toward the mounting member while permitting the knife to move relative to the mounting member when the cutting edge of the knife rotates toward the second cutting position in contact with the first shear bar so as to cut the two twine strands.

2. A round baler as recited in claim 1, wherein each biasing member is a spring.

3. A round baler as recited in claim 1, where each biasing member is a washer or grommet made of elastically compressible material.

4. A round baler as recited in claim 1, wherein the bale wrapping apparatus further comprises:
　(e) two additional twine supply rolls rotatingly connected to the housing and defining two additional twine strands;
　(f) two additional twine dispensing arms, each dispensing arm presenting one of the two additional twine strands;
　(g) a second shear bar connected to the housing; and
　(h) a second knife assembly rotatingly connected to the housing by the elongated bar and rotatable from a first position to a second cutting position in contact with the second shear bar, wherein each twine dispensing arm is movable from a first position presenting one of the two additional twine strands to the bale to a second position wherein each one of the two additional twine strands extends transversely between the second shear bar and the second knife assembly, the second knife assembly comprising:
　　(i) a mounting assembly comprising a mounting member having two protruding posts;
　　(ii) a knife having two slots formed therein and a cutting edge, the knife mounted on the mounting member so that each protruding post extends through one of the slots; and
　　(iii) a biasing member disposed on each post so as to bias the knife toward the mounting member while permitting the knife to move relative to the mounting member when the cutting edge of the knife rotates toward the second cutting position in contact with the second shear bar so as to cut the two additional twine strands.

5. A round baler as recited in claim 4, wherein each biasing member is a spring.

6. A round baler as recited in claim 4, where each biasing member is a washer or grommet made of elastically compressible material.

7. A round baler as recited in claim 1, wherein the biasing member permits the knife to move away from the mounting member.

8. A round baler as recited in claim 4, wherein the biasing member of the first knife assembly biases the knife of the first knife assembly against the mounting member of the first knife assembly so as to permit relative rotational movement therebetween and the biasing member of the second knife assembly biases the knife of the second knife assembly so as to permit relative rotational movement therebetween.

9. An assembly for cutting multiple twine strands comprising:
   (a) a shear bar;
   (b) a rotatable bar;
   (c) a mounting assembly comprising a mounting member having two protruding posts, the mounting assembly being attached to the rotatable bar;
   (d) a knife having two slots formed therein and a cutting edge, the knife mounted on the mounting member so that each protruding post extends through one of the slots; and
   (e) a biasing member disposed on each post so as to bias the knife toward the mounting member; while permitting the knife to move relative to the mounting member;
   wherein the cutting edge of the knife is rotatable toward a cutting position in contact with the shear bar so as to cut multiple twine stands .

10. A knife assembly as recited in claim 9, wherein each biasing member is a spring.

11. A knife assembly as recited in claim 9, where each biasing member is a washer or grommet made of elastically compressible material.

12. A knife assembly as recited in claim 9, wherein the biasing member permits the knife to move away from the mounting member.

* * * * *